(12) United States Patent
Dagan et al.

(10) Patent No.: US 7,170,065 B2
(45) Date of Patent: Jan. 30, 2007

(54) DIRECT DETECTION OF HIGH-ENERGY SINGLE PHOTONS

(76) Inventors: Ofer Dagan, Mevo HaShikma 20/1, 90917 Givat Ze'ev (IL); Barry Neal Breen, Post Office Box 580, HaMacabim 67, 90917, Givat Ze'ev (IL); Haim Hermon, Bar Kochva 2, 97875, Jerusalem (IL); Robert A. Street, 894 La Para Ave., Palo Alto, CA (US) 94306-2647

( * ) Notice: Subject to any disclaimer, the term of this patent is extended or adjusted under 35 U.S.C. 154(b) by 405 days.

(21) Appl. No.: 10/653,190

(22) Filed: Sep. 3, 2003

(65) Prior Publication Data

US 2004/0094720 A1 May 20, 2004

(51) Int. Cl.
*G01T 1/24* (2006.01)
(52) U.S. Cl. .................................. 250/370.12
(58) Field of Classification Search ............ 250/370.12
See application file for complete search history.

(56) References Cited

U.S. PATENT DOCUMENTS

| | | | | |
|---|---|---|---|---|
| 3,787,620 | A | * | 1/1974 | Pieters et al. ............. 348/135 |
| 5,464,984 | A | * | 11/1995 | Cox et al. ............. 250/370.11 |
| 6,243,441 | B1 | * | 6/2001 | Zur ............................ 378/98.8 |
| 2003/0021382 | A1 | * | 1/2003 | Iwanczyk et al. .......... 378/175 |

OTHER PUBLICATIONS

Street, R.A. et al.: *Comparison of PbI₂ and HgI₂ for direct detection active matrix x-ray image sensors*, Journal of Applied Physics, Mar. 1, 2002, vol. 91, No. 5, p. 3345-3355.

Approaching the Theoretical X-ray sensitivity with HgI2 Direct Detection Image Sensors, R. A. Street, et al, SPIE Conf. Proc. 4682, p. 414, 2002.

Barber, H.B. et al.: *Progress in developing focal-plane-multiplexer readout for large CdZnTe arrays for nuclear medicine applications*, Realtime Radiography-02 6481121, Sep. 14, 2003, No. 288, p. 1-8.

Schieber et al., Medical Imaging Pro. SPIE, Denver 1999, vol. 3770 (1999), 146-155.

R. A. Street, "Large Area Image Sensor Arrays", Chapter 4, *Technology of Amorphous Silicon* (R. A. Street, ed.) Springer-Verlag (Heidelberg) 2000.

* cited by examiner

*Primary Examiner*—David Porta
*Assistant Examiner*—Christine Sung
(74) *Attorney, Agent, or Firm*—Oliff & Berridge, PLC

(57) ABSTRACT

A method for detecting single photons of high energy radiation using a detector comprising an array of pixels, each pixel including a charge receptive substrate. The method includes the operations of capturing high energy photons with the pixel array, collecting the charges generated in each pixel by the charge receptive substrate of that pixel, reading out the collected charges and analyzing the read out charges. In addition, a system for detecting single photons of high energy radiation is described. The system includes a pixel array in which each pixel includes a polycrystalline photoconductive film deposited on a charge receptive substrate. The system further includes low noise electronics for reading out the charges generated by high energy photons when the latter interact with the film. Additionally, the system includes a data processor in communication with the low noise electronics.

32 Claims, 11 Drawing Sheets

DIRECT DETECTION OF HIGH-ENERGY SINGLE PHOTONS

FIELD OF THE INVENTION

The present invention relates to a method and system for detecting and imaging high-energy single photons.

BACKGROUND OF THE INVENTION

There is a growing interest in digital radiography which offers faster results, easier processing, and easier storage than traditional x-ray photographic techniques. Applications for this form of radiography include medical diagnostics, port security and non-destructive testing.

Radiation detection by digital radiography includes both indirect and direct detection. Indirect detection uses a thin photodiode, usually an amorphous silicon p-i-n diode, to detect light from a phosphor conversion screen which is placed in direct contact with an array detector. The emitted light is produced by the interaction of the detector and x-ray or gamma ray photons.

Direct detection uses a thick x-ray sensitive photoconductor to absorb the x-rays and create the signal charge. Generally, direct detection is considered the better approach because image blur is expected to be small. Furthermore, direct charge collection offers the better possibility for high efficiency x-ray or gamma ray conversion. The photoconductor of a direct detection apparatus must combine high ionization rate, high charge collection, low dark current, high modulation transfer function (MTF) and the ability to be deposited over a large area. This last feature requires the use of either an amorphous or polycrystalline material.

Imaging detectors first employed single crystals, but while single crystals can give excellent single photon detection, their cost and the difficulty in obtaining crystals of the size required for large area detectors have reduced their usefulness.

Recently, polycrystalline films of photoconductive wide band gap semiconductor materials have been used instead of single crystals for large area detectors. The principal wide band gap semiconductor material used has been Se, although other materials such as $PbI_2$ and $HgI_2$ have been tried. Generally, single crystals have better detection properties and are preferable to polycrystalline materials for detection. For example, single crystal $HgI_2$ detectors perform better then polycrystalline $HgI_2$ detectors because, among other things, the mobility-lifetime (mu-tau) product of single crystals is of the order of $10^{-4}$ cm$^2$/Vsec compared to that of films where the product is $10^{-5}$ cm$^2$/Vsec or less. A higher mu-tau allows for better charge collection.

Notwithstanding the above, large area imaging systems typically are fabricated as polycrystalline array detectors. Semi-conducting polycrystalline material is generally deposited by any of a variety of methods, but typically by physical vapor deposition (PVD) or plasma enhanced chemical vapor deposition (PECVD). A description of the deposition of polycrystalline materials on high energy detectors by PVD is described inter alia in M Schieber et al., Medical Imaging Pro. SPIE, Denver 1999, Vol. 3770 (1999), 146–155, which is herein incorporated by reference in its entirety.

FIG. 1, to which reference is now made, shows a block diagram of a typical prior art imaging system using either single crystal or polycrystalline pixelated array detectors. The electronics used with these detectors are configured to produce images by using the photogain and dark current readings of the system.

FIG. 1 shows a prior art schematic block diagram of a pixelated array and electronics appended thereto which can be used to detect and image high energy radiation. The diagram indicates a pixelated array 12 to which readout amplifiers 14 and gate drivers 16 are connected. High energy photons impinge on photoconductive material deposited on the pixels of array 12; the photons generate electron/hole pairs, which are collected by a charge collecting substrate, often a thin film transistor (TFT). Depending on the selected bias either the electrons or holes can be collected.

The electronics take the image acquired at every addressed pixel of the array and organize the sequential transfer of digital data to a processor 22, usually a computer processor. The gate addressing lines of the array are connected to gate drivers 16 that provide sequential addressing pulses. These integrated circuits (ICs) usually have 100–200 channels so that several are required for a large area, high-resolution imager. The readout amplifiers 14 sense the charge on the data lines and then amplify the analog signal providing it to analog-to-digital (A/D) converters 18. The signal is than digitized and passed to a computer image processor 22 for processing and display. The image processor 22 processes the data and sends it for display on image display 24. Additionally, there is a control logic unit 20A that provides timing for the operations and a power regulation unit 20B which provides filtered dc power to the system.

Reference is now made to FIG. 2 which illustrates a typical prior art pixel equivalent circuit 40 for a photoconductor detector plate 44 in an x-ray imaging system. Circuit 40 shows one detector electrode 58 connected to a bias voltage 50. The second electrode 56 is connected to a storage capacitor 46 and a switching thin-film transistor (TFT) 42. Storage capacitor 46 is connected to a ground plane 48. Thin-film transistor 42 is connected to both a gate line 62 and a data line 60, with data being fed to a readout unit (not shown) through data line 60.

Reference is now made to FIG. 3 where another schematic representation of the prior art electronics and photodetector used for single photon detection as discussed herein is shown. FIG. 3 can be considered as a conflation of FIGS. 1 and 2 shown above. Similarly, items in the Figure have been given numerals identical with those in FIGS. 1 and 2 and therefore the description of these items and their function will not be repeated. Area 65, circumscribed by a broken line, represents that portion of the system found in each pixel of array 12 (FIG. 1). The TFT of each pixel is connected to a gate addressing line 62 and a data addressing line 60 which are connected to gate drivers 16 and readout amplifiers 14 of FIG. 1.

X-ray detectors fabricated from single crystal photoconductive semiconductors, with typical dimensions of 1×1×1 mm, are known to give good energy resolution for x-ray detection. To date, the only detection apparatus for detecting single x-ray photons in, for example, the 80–90 keV range, has been fabricated from single crystal photoconductive semiconductors and has dimensions typically about 1×1×1 mm. Attempts have been made to make single crystal array detectors which typically have 64×64 pixels, each pixel being about 100–125 microns×100–125 microns. However, this number and size of pixels is too small for radiography and is limited by the problems of making large single crystals and the methods by which the crystals are bonded to silicon substrates. Such arrays are discussed in Nuclear Instruments and Methods a, vol. 38, 1996 pp 252–255 and 262–265.

Flat panel detectors constructed essentially as described in FIGS. 1–3 above are becoming widely used for x-ray and medical imaging. These often comprise several million pixels, each pixel the size of from about 100 to about 300 μm, and the overall array size can reach up to 40×40 cm. Such detectors generally are made using polycrystalline or amorphous photoconductive materials. Single photon x-ray detection has not been achieved with these systems because the signal-to-noise ratio has been too low. This is due to a combination of low x-ray conversion efficiency in non-single crystal detectors and the high noise electronics used in these systems.

Present day array detectors, whether employing polycrystalline or amorphous photoconductive materials, all operate in a charge collection mode where they collect charge over time with one readout per image produced. Detectors operating in such a mode generally require higher fluxes and longer exposures than would be required by a successful single photon detector.

There are uses in medicine and elsewhere for detectors which must detect low flux high-energy radiation. A single photon large area detector array having smaller pixel size, and hence higher resolution with better sensitivity, would fill a need and would be applauded by the medical community.

An example of the state of prior art high energy radiation direct detectors that make use of polycrystalline and single crystal photoconductive materials is discussed in the following publications and references cited therein:

Comparison of PbI2 and HgI2 for direct detection active matrix x-ray image sensors, R A Street et al, J. Appl. Phys., 91,3345 (2002);

Approaching the Theoretical X-ray sensitivity with HgI2 Direct Detection Image Sensors, R. A. Street, et. al, SPIE Conf. Proc. 4682, p 414, 2002.

Definitions

In what is discussed herein, including the claims, the following terms will be used with the following meanings:

Single photon detection—detection of 0–5 photons in a pixel per period of measurement. The exact number of measurable photons is determined inter alia by the readout of the charge collected by the charge collecting substrate. Primarily photons are used in the discussion herein but other ionizing radiation is also intended.

Polycrystalline—a non-single crystal material, either polycrystalline or amorphous.

S/N—signal-to-noise ratio.

Detective quantum efficiency (DQE)—$(S/N)^2_{out}/(S/N)^2_{in}$. DQE measures the performance of a detector by measuring how well the incident S/N is retained by the detector.

Charge collection mode—a mode of detection or imaging wherein charge from a pixel is collected every frame and where the amount of charge, which can range between near zero up to a very high charge, is limited only by the breakdown characteristics of the pixel capacitor, pixel charge receptive substrate, for example, a thin film transistor (TFT), and the amplifier electronics; also used interchangeably herein with high flux mode without any intent to distinguish between them.

Single photon mode—a mode of detection or imaging wherein the readout frame rate is sufficiently high that only a few photons can impinge on each pixel during each frame; also used interchangeably herein with low flux mode without any intent to distinguish between them.

Detect—in addition to its conventional meaning also used synonymously and interchangeably for count, as with single photon events.

Frame rate—one readout cycle, where the readout encompasses reading out each pixel of the array.

Fluoroscopic mode—sequential frame readout.

Fluoroscopically—imaging using sequential frame readouts.

Low flux—herein, fewer than six photons per pixel per frame. In general, it is equal to or less than the maximum number of photon events that can be detected in one pixel in one frame. This maximum is determined by the sensitivity of the semiconductive film, the noise of the system and the incident photon energy spectrum.

High energy radiation—radiation above 10 keV. Radiation, as used herein, typically refers to photons, but the discussion could also include other kinds of ionizing radiation, such as ionizing particles, with this energy.

Saturation—any predetermined number of photons. For reasons discussed herein, this number has been taken as more than five photons throughout the text.

Image—the final output after processing the detected counts per pixel.

Pij—the $i,j^{th}$ pixel of an r×s array detector, where i and j are $i \leq r$ and $j \leq s$.

When the term "step" is used hereinbelow, it should be construed as equivalent to the term "operation".

SUMMARY OF THE PRESENT INVENTION

It is an object of the present invention to provide a system and method for detecting low flux, high energy radiation and to use them for imaging. The method and system can be used for low flux or low exposure medical imaging, non-destructive testing, security screening and other applications.

It is yet another object of the present invention to provide a device and method for use in both high and low flux, high energy radiation detection and imaging.

It is still another object of the present invention to increase spatial resolution in low flux, high energy radiation imaging.

A further object of the invention is to provide a device and method for imaging low flux, high energy radiation wherein the images have high spatial resolution per radiation energies, i.e. both high spatial and energy resolution.

It is yet another object of the present invention to provide a system for single photon x-ray imaging that can completely discriminate against electronic noise in the system providing an essentially constant detective quantum efficiency (DQE) for images acquired at low exposures. It can also provide energy resolution to discriminate a desired signal from unwanted background radiation at a different energy.

There is thus provided in accordance with the present invention a method for detecting single photons of high-energy radiation using a detector comprising an array of pixels, each pixel including a charge receptive substrate. The method includes the steps of: capturing high energy photons with the pixel array, the photons generating high-energy ionizing particles within a polycrystalline film deposited on the pixels, and whereby the ionizing particles generate charges; collecting the generated charges in each pixel by the charge receptive substrate of the pixel; reading out the collected charges using low noise electronics; and analyzing the read out charges. Further, in accordance with the present invention, the method uses an array in which the pixels are each less than 1×1 mm and/or a polycrystalline film having a mobility-lifetime product greater than $10^{-5}$ cm$^2$/Vsec.

Additionally, in accordance with a preferred embodiment of the present invention, the analyzing step includes the step of comparing the read out collected charges from the reading out step to a previously determined relationship. The relationship is generated from a prior calibration based on a statistical analysis of charge/photon over a an expected range of photon energies. The relationship is stored in a processor prior to beginning the capturing step. The relationship relates the number of charges generated per incident photon and is typically a look-up table or a function.

Additionally, in accordance with a preferred embodiment of the present invention, the method further includes the step of imaging the pixels in which single photons have been detected.

In accordance with a preferred embodiment of the present invention, the analyzing step of the method further includes the steps of: comparing the read out collected charges from the reading out step to a previously determined relationship, the relationship generated from a calibration based on a statistical analysis of charge/photon over an expected range of photon energies, the relationship stored in a processor prior to beginning the capturing step; identifying the pixels interacting with fewer than a predetermined number of photons during a readout based on the comparison of the comparing step; recording the number of photons of each identified pixel in a frame; and after the analyzing step, preparing an image based on the pixels identified in the identifying step. The relationship may be stored as a look-up table, a function and a formula.

Additionally, in a preferred embodiment of the present invention, the analyzing step of the method includes detecting single photon events in a series of frames taken over a period of time. In some embodiments, the series of frames is imaged as a series of images. In others, the series of frames is accumulated pixel-by-pixel into a single image. Each pixel of the image is equal to the sum of the corresponding pixels in the series of frames.

Additionally, in accordance with a preferred embodiment of the present invention, the analyzing step of the method further includes a discriminating step that discriminates between photon energies differing by at least 5 keV. The discriminating step is effected by using a readout rate which detects no more than one photon per frame.

Additionally, in accordance with a preferred embodiment of the present invention, the analyzing step of the method further includes the steps of: switching to charge collection mode when a pixel is located in a high radiation flux environment; processing the collected charges according to charge collection mode; returning to the single photon mode when the pixel is located in a low radiation flux environment, thereby detecting single photon events in that pixel; and repeating the switching through returning steps as often as dictated by the magnitude of the radiation flux. The switching and returning steps are typically effected by a processor having discriminator software that discriminates in real time whether a pixel is in a low or a high flux environment. In another embodiment of this last embodiment, the method further includes the step of imaging the detected photons produced by the single photon events.

Additionally, the charge receptive substrate is chosen from a group consisting of a thin film transistor (TFT), a complementary metal oxide semiconductor (CMOS), and a charge coupled device (CCD).

Additionally, in accordance with a preferred embodiment of the present invention, the detector used in the method detects on average at least one electronic charge for each 15 eV or less of incident high energy radiation detected.

Additionally, in accordance with a preferred embodiment of the present invention, the polycrystalline film used to capture photons is chosen from a group of materials consisting of mercuric iodide, bismuth iodide, lead iodide, thallium bromide, selenium, lead oxide, mercuric telluride, cadmium-zinc-telluride, and cadmium telluride.

Additionally, in a preferred embodiment of the present invention, the high energy radiation of the method is high flux radiation and the charges it produces are read out rapidly in the reading out step so that it generates effective low flux single photon events detectable during the analyzing step.

The method of detecting single photons of high-energy radiation according to any of the embodiments of the present invention described above is effected by:
  a detector comprising an array of pixels, each pixel having:
    a polycrystalline photoconductive film having a mobility-lifetime product exceeding $10^{-5}$ cm$^2$/Vsec;
    a conductive contact pad to contact the polycrystalline film;
    a conductive contact deposited on top of the film, the contact to provide a bias voltage;
    a charge receptive substrate which collects charges generated in the films by the high-energy photons, the substrate having the film deposited thereon;
  low-noise electronics in communication with, and reading out the charges collected by, the substrate; and
  a processor for processing signals transferred from the electronics, the processor using a previously determined relationship between charges generated by a given number of incident photons to detect single photons, the relationship being stored in the processor.

There is provided in accordance with another aspect of the present invention a system for detecting high energy single photons. The system includes a detector which is comprised of a pixel array. Each pixel of the array includes a polycrystalline photoconductive film deposited on a charge receptive substrate. The detector is operative to capture high-energy photons. The system also includes low noise electronics for reading out charges generated by the high energy photons when the photons interact with the film. The generated charges of each of the pixels is collected by the charge receptive substrate of the pixel and read out by the electronics. Finally, the system includes a data processor in communication with the low noise electronics. The processor includes a stored previously determined relationship between charge generated per incident photon. The relationship is compared to the collected charges, thereby detecting single photons. In the system of the present invention, the polycrystalline film has a mobility-lifetime product exceeding $10^{-5}$ cm$^2$/Vsec.

Additionally, the charge receptive substrate of the pixels in the system are chosen from a group consisting of a thin film transistor (TFT), a complementary metal oxide semiconductor (CMOS), and a charge coupled device (CCD).

In embodiments of the system, the stored relationship is typically a look-up table or a function generated from a prior calibration of charges generated per incident photon.

In yet another embodiment of the present invention, the processor of the system is preprogrammed to determine the magnitude of the radiation flux, and to switch processing from the charge collection mode to the single photon mode and vice-versa when the system or parts thereof are positioned in fluxes of different or varying magnitudes. In the system the switching is effected by processor software which determines when the flux impinging a pixel is below a predetermined threshold value.

In another embodiment of the present invention, the charge receptive substrate of each pixel is comprised of an electronic circuit fabricated from thin film electronic devices deposited on an inert substance. In a further embodiment of the present invention, the thin film electronic devices used in the system are chosen from a group consisting of amorphous silicon and polysilicon transistor devices.

BRIEF DESCRIPTION OF THE DRAWINGS

The present invention will be understood and appreciated more fully from the following detailed description taken in conjunction with the drawings in which.

Similar elements in the Figures are numbered with similar reference numerals.

DETAILED DESCRIPTION OF PREFERRED EMBODIMENTS

Figure 1:
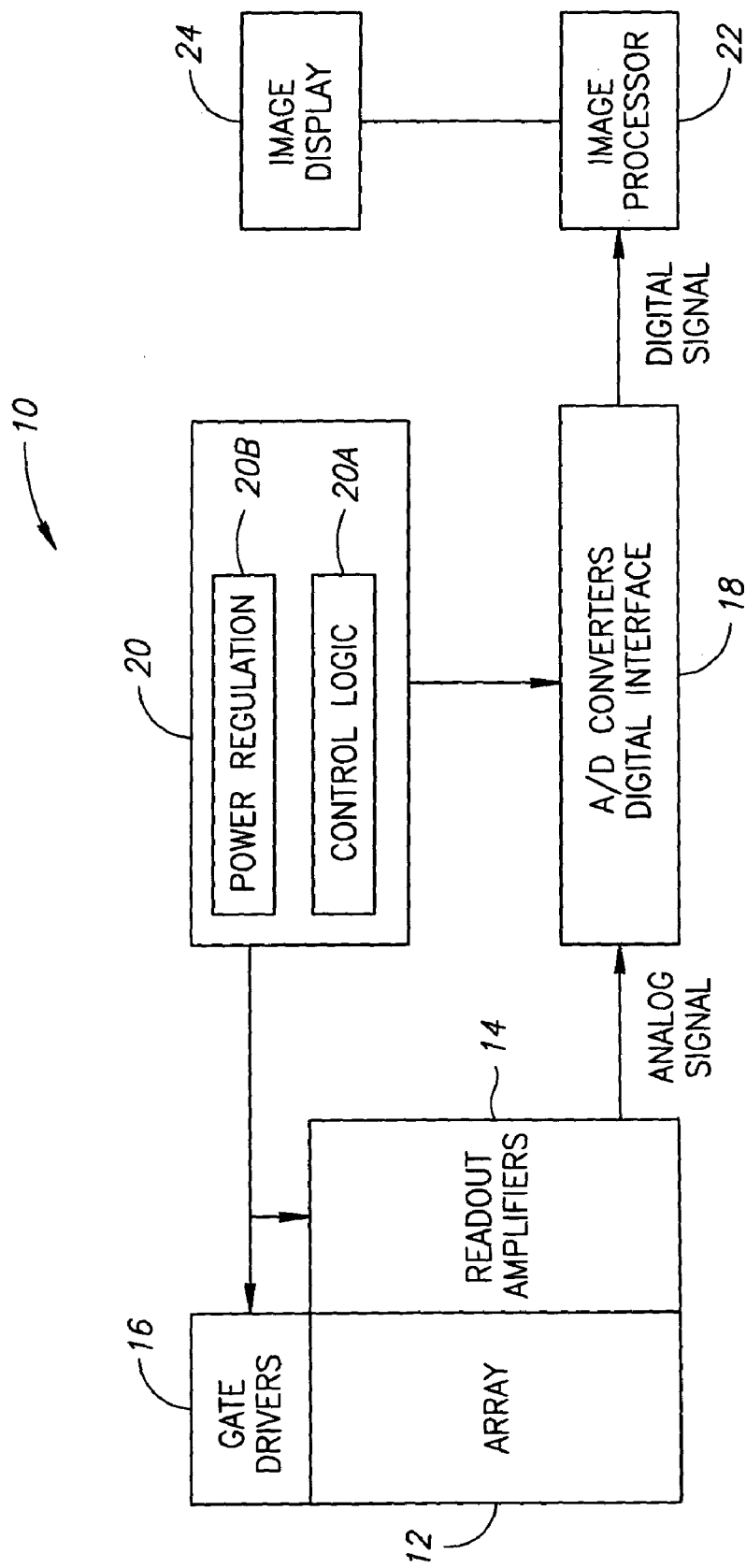
FIG. 1 is a block diagram of a typical prior art detector used in the present invention.

The inventors have developed a method and system for high energy single photon detection and imaging. The method and system employ a large area matrix array using a polycrystalline photoconductor having high x-ray conversion sensitivity, i.e. high mobility-lifetime product, low energy required per electron-hole pair produced, and low noise electronics. The polycrystalline photoconductor is typically, but not necessarily, a wide band gap semiconductor.

Inventors herein demonstrate that polycrystalline photoconductive detectors, such as $HgI_2$ detectors, having a high mobility-lifetime product, i.e. $>10^{-5}$ cm$^2$/Vsec, and low energy required per electron-hole pair produced, when used in conjunction with low noise electronics, can achieve a sensitivity whereby single photons can be detected and single photon imaging can be achieved.

It should be noted that the intrinsic limitations of polycrystalline photoconductors, such as their limited sensitivity, the grain boundaries they introduce, and the trapping sites they provide, would dissuade one skilled in the art from any attempt at using these materials in single photon detectors.

Surprising also is that the method and system described herein employ an array of pixels in which each pixel has a size less than 1×1 mm, smaller than the pixel sizes used in single crystal, single photon detectors. This allows for higher spatial resolution than presently obtainable with single photon, single crystal detectors. TFT arrays for single photon detection using pixels of these sizes provide pixel size/spatial resolution of 0.1 mm.

The sensitivity of the detector is such that, on average, the detector detects at least one electronic charge for each 15 eV or less of ionizing radiation energy detected. For single photon detection, the thickness of the photoconductor typically is sufficient to absorb more than 50% of the incident radiation.

Single photon detection using the method and system of the present invention can discriminate against noise in the electronic system. It can also provide energy resolution to discriminate a desired signal from unwanted background radiation at different energies, particularly when the rate of readout is high.

There is an inherent benefit in using the single photon method of the present invention. It permits the reduction of x-ray flux and exposure to patients undergoing radiological tests. By collecting the image data fluoroscopically and counting single photons rather than using the standard radiographic procedure of collecting charge over time, exposure times and total radiation doses can be reduced. The series of images collected fluoroscopically can range between 1 to about 100 images per second and more typically between about 15 and about 30 images per second.

The single photon counting method described herein relies on a system having a high S/N ratio, and therefore, it provides better resolution for low flux than the standard prior art charge collection method. Single photons are easily identified above the various sources of electronic noise and the dark current present in the system. The accumulated charge resulting from use of standard prior art radiographic methods, especially in low flux situations, contains excessive electronic noise and dark current, which results in lower DQE and resolution.

The term low noise electronics as discussed herein refers to electronics such as that described in R. A. Street, "Large Area Image Sensor Arrays", Chapter 4, *Technology of Amorphous Silicon* (R. A. Street, ed.) Springer-Verlag (Heidelberg) 2000 which is incorporated by reference herein in their entirety.

In what is described herein, the polycrystalline photoconductor employed is $HgI_2$. However, this material is not to be considered limiting. Other photoconductive materials with mobility-lifetime products and sensitivities as defined above may also be used. This may include, but is not limited to, $PbI_2$, TlBr, Se, $BiI_3$, PbO, mercuric telluride (HgTe), cadmium zinc telluride (CZT) and cadmium telluride (CdTe). Many of these materials are wide band gap semiconductors. The method of deposition of the polycrystalline films includes a wide variety of techniques, but typically, deposition is effected by physical vapor deposition (PVD) or plasma enhanced chemical vapor deposition (PECVD). Composite particles in binders (PIB) may also be used.

The array used to demonstrate single photon detection had 512×512 pixels. Each pixel had a size of 100 μm×100 μm, and its operation has been described in *Approaching the Theoretical X-ray sensitivity with HgI2 Direct Detection Image Sensors*, R. A. Street, et. al, SPIE Conf. Proc. 4682, p 414, 2002, which is incorporated by reference herein in its entirety. A 130 μm thick layer of polycrystalline HgI$_2$ was deposited on the array by vacuum evaporation, and a carbon contact was applied on top of the HgI$_2$. The array was operated with a frame time of 0.2–0.3 sec during the measurements described below.

High exposure measurements detected a charge collection that approached saturation at about 30V, and a fit to the charge collection formula (Modified Hecht formula) gave a mobility-lifetime product of $1.5 \times 10^{-5}$ cm$^2$/Vsec, with an estimated charge collection of 85% at 30V. A comparison of charge collection under positive and negative bias revealed that mainly electrons contribute to the charge collection. The dark current introduced some additional noise at high bias voltages. Measurement of the line-spread function showed that the spread of the signal to neighboring pixels was no more than 5%, and most of this was attributable to the finite slit width of the angledslit measurement.

Low exposure measurements were made with a simple x-ray generator operating at 100 kVp. A 3 mm lead filter was inserted to reduce the flux and harden the beam. A bias voltage of 20V was chosen to give high charge collection while limiting additional noise from the dark current. Measurements were made on a region of interest in the array comprising ~45,000 pixels (about 20% of the array).

Figure 4:
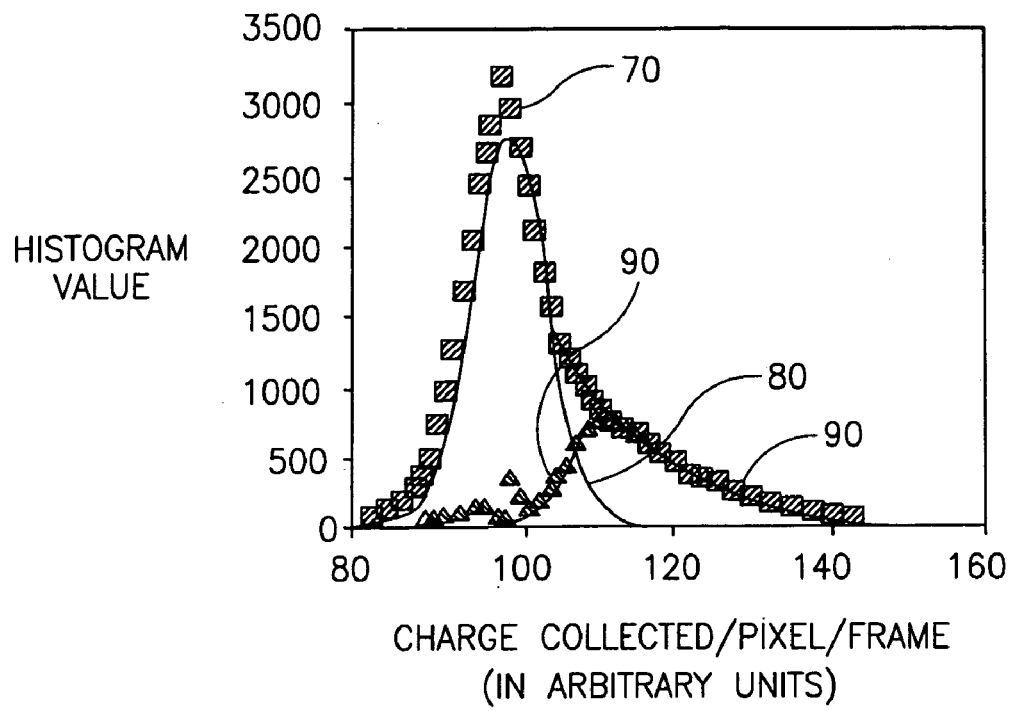
FIG. 4 shows a histogram of the difference between unexposed and exposed images versus charge collected per pixel per frame.

Signals in the dark and under low x-ray exposure were acquired and histograms of the difference were created. The exposure was chosen so as to provide a low probability that an x-ray is incident on a pixel. One of these histograms is shown in FIG. 4 to which reference is now made. Curve 70 in FIG. 4 is the signal response to x-ray exposure. The solid black line 80 in the Figure is the dark response and represents a Gaussian fit of the data taken in the dark. Curve 90 represents the difference between curve 70 less the dark response signal 80. The histogram in FIG. 4 shows a zero signal peak (shifted to 100 arbitrary charge units for convenience) and a tail to larger signal, which is the contribution from pixels that experience one or more x-ray absorption events. The dark signal is broadened due to the noise from the electronics and from the dark signal itself. The dark signal is clearly identified from measurements without any exposure, and is removed by fitting the peak to a Gaussian.

Figure 5:
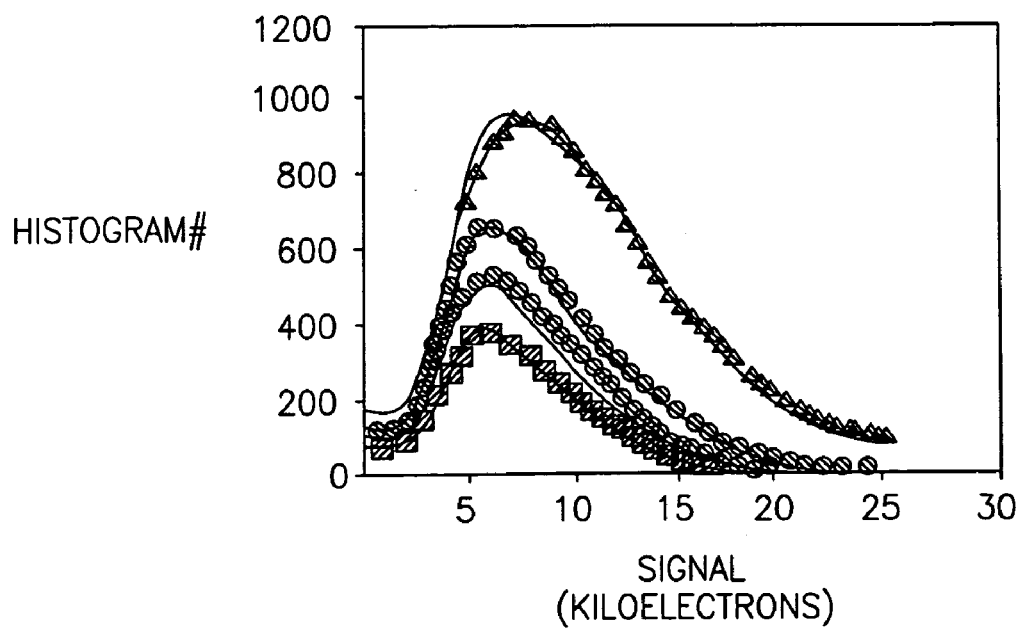
FIG. 5 shows a histogram at different excitation intensities and with the solid lines representing fits to the model given by Eq. 1 discussed herein.

The residual signal from the x-ray exposures is shown in FIG. 5, to which reference is now made, for different x-ray fluxes obtained by varying the exposure time. As exposure time increases, the histogram initially increases in intensity but not in position. While not obvious, this is evidence for the observation of a single x-ray photopeak as discussed below. At the highest exposure, there is also a significant broadening of the photopeak to larger values, which can be interpreted as an increasing probability that two photons are detected by a pixel.

To confirm the detection of single photons, the response is modeled by fitting it to assumed histogram shapes ($S_1(n)$, $S_2(n)$) for the response to 1 or 2 photon detection respectively, with $S_2(n)$ having twice the peak position and almost twice the width of $S_1(n)$. The measured histogram is given by, $$H(n) = N_1 S_1(n) + N_2 S_2(n) \quad \text{Eq. 1}$$

where $N_1$ and $N_2$ are the number of 1 and 2 photon events, and higher numbers of events are ignored as being statistically insignificant. The number of pixels that respond and their fraction of the total is obtained directly from the histogram measurements by comparing the counts in the photopeak and dark peak. These are also shown in Table 1 below for the different exposures. The fractional values of $N_1$ and $N_2$ are calculated from the Poisson statistics, and these are shown in the Table. The solid lines in FIG. 5 are fits to the data, with the only adjustable variable being the shape of the response. The model achieves a good fit and clearly reproduces the broadening of the histogram due to photon pile-up. Pile-up is the term used to indicate when more than a single photon arrives at a pixel during the period of measurement. The lowest intensity data in FIG. 5 has only 10% of 2-photon events and so the measured histogram shape is close to the response for a single photon, with some broadening due to noise.

Eq. 1, used above, is recognizable to those skilled in the art as a curve fitting formula used in various fields of spectrometry. It is readily understandable to one skilled in the art that other curve fitting formulae can be used as well to establish single photon events.

Figure 6:
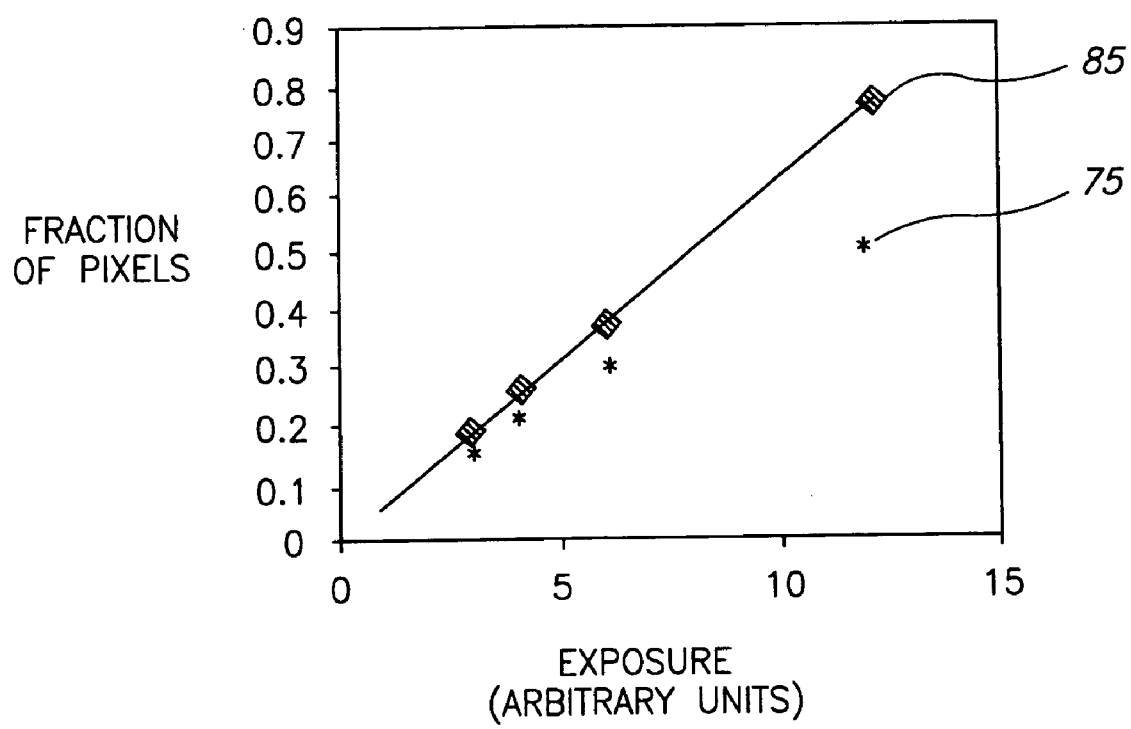
FIG. 6 shows a plot of the measured fraction of pixels that record absorption events versus exposure.

FIG. 6 (based on Table 1 below) is a plot that measures the fraction of pixels that record absorption events, and the number of absorbed photons calculated after correcting for pile-up statistics. The expected linear response to exposure is observed. The crosses 75 in FIG. 6 are the number of pixels detecting photons versus exposure. The diamonds 85 in FIG. 6 are the calculated number of photons detected at a single pixel, including pile-up effects, i.e. two photon events.

TABLE 1

| Relative exposure | Number of pixels that detect photons | Fraction of pixels detecting photons | Calculated number of photons detected based on random statistics to calculate pile-up | Fraction of pixels detecting two photons based on columns 3 and 4 |
|---|---|---|---|---|
| 3 | 8203 | 0.177 | 0.195 | 0.100 |
| 4 | 10912 | 0.236 | 0.27 | 0.145 |
| 6 | 14678 | 0.317 | 0.38 | 0.198 |
| 12 | 24565 | 0.531 | 0.76 | 0.431 |

The data in FIG. 5 is converted to a measured number of electrons based on a calibration of the detection system. This reveals that the average signal per photon, i.e. charge per photon, is about 7000 electrons and the maximum is about 15000 electrons.

For the present sample, operation at higher bias was limited by the leakage current, which enhanced noise. Other HgI$_2$ samples have demonstrated lower leakage. Low leakage material allows a higher applied bias and improves the collection of holes.

Although the results presented above show essentially no energy resolution, this observation of the individual photopeak for active matrix detectors reaches a new threshold of sensitivity. It also opens up a new diagnostic tool for further optimization of the sensitivity, since the photo-peak is much easier to analyze than the integrated signal which is obtained under usual prior art charge collection operating conditions. Further improvements in charge collection with some reduction in the dark noise can be expected to allow energy resolutions of 5–10 keV. This would require further improvements in materials, for example further increases in the material's film density. Reducing dark current would also require lower conductivity or better blocking contacts. This will allow a higher bias voltage, which will increase the signal. Reducing the electronic noise can be done using techniques known in silicon-based integrated circuit technologies. Increased hole collection will also assist in energy discrimination. Hole collection can be increased by minimizing traps and increasing bias.

When using the single photon mode, counting is done using computer based statistical algorithms. These counts allow for the spatial resolution of the signals. However, when there is a fast readout rate, the single photon method should be able to discriminate between photon energies as well. Energy discrimination could reach 5–10 keV depending on increased sensitivity, higher mobility-lifetime (mu-tau) product and close to complete charge collection in the photoconductive materials used.

The acquisition of a complete clear image by single photon counting typically requires that each pixel records many individual events. Such image acquisition may be achieved by a rapid readout of many images in sequence, with the required readout speed depending on the x-ray flux. Since TFTs currently have their charge read out at about a maximum of 30 times a second, this represents the maximum theoretical number of photons per pixel that can be counted by the single photon method. Practically, the current limit probably does not exceed five photon events per pixel. It should be noted that when using the single photon method described herein, the faster or more often the readouts, the less noise and the greater the S/N ratio. This should be contrasted with the fact that when using the charge collection method increasing the frame rate actually increases electronic noise. Similarly, fast readouts can be used to effectively convert high flux environments to low flux environments thereby allowing for the use of the method of the present invention in high flux environments.

Based on the above, a system such as the one shown in FIG. 1 can be modified so that single photon events can be detected, counted or imaged. This requires that a means for comparing actual charge collected with a known relationship of charge produced/incident photon be included in processor 22 of FIG. 1. The known relationship is determined prior to detection, counting or imaging and is determined even prior to the construction of the system. The relationship can be determined very much as described above using statistical analysis and/or equations similar to Eq. 1 over the expected distribution of photon energies. The charge produced/incident photon relationship can then be formulated as a look-up table, formula or other such means and included in the processor. By using the look-up table, formula or other such means, the actual number of photons which impinge on the pixel array during a frame (readout) can be detected and counted and, if desired, processed further for imaging.

As far as is known by the Inventors, all previous attempts at making pixelated array detectors either take the signal directly to external electronics or mount the detector on a silicon substrate which has electronics. There have been no reports of a single photon detector device using substrates based on thin film technology on glass or other inert substances, substrates that may be used with the present invention.

Figure 7A:
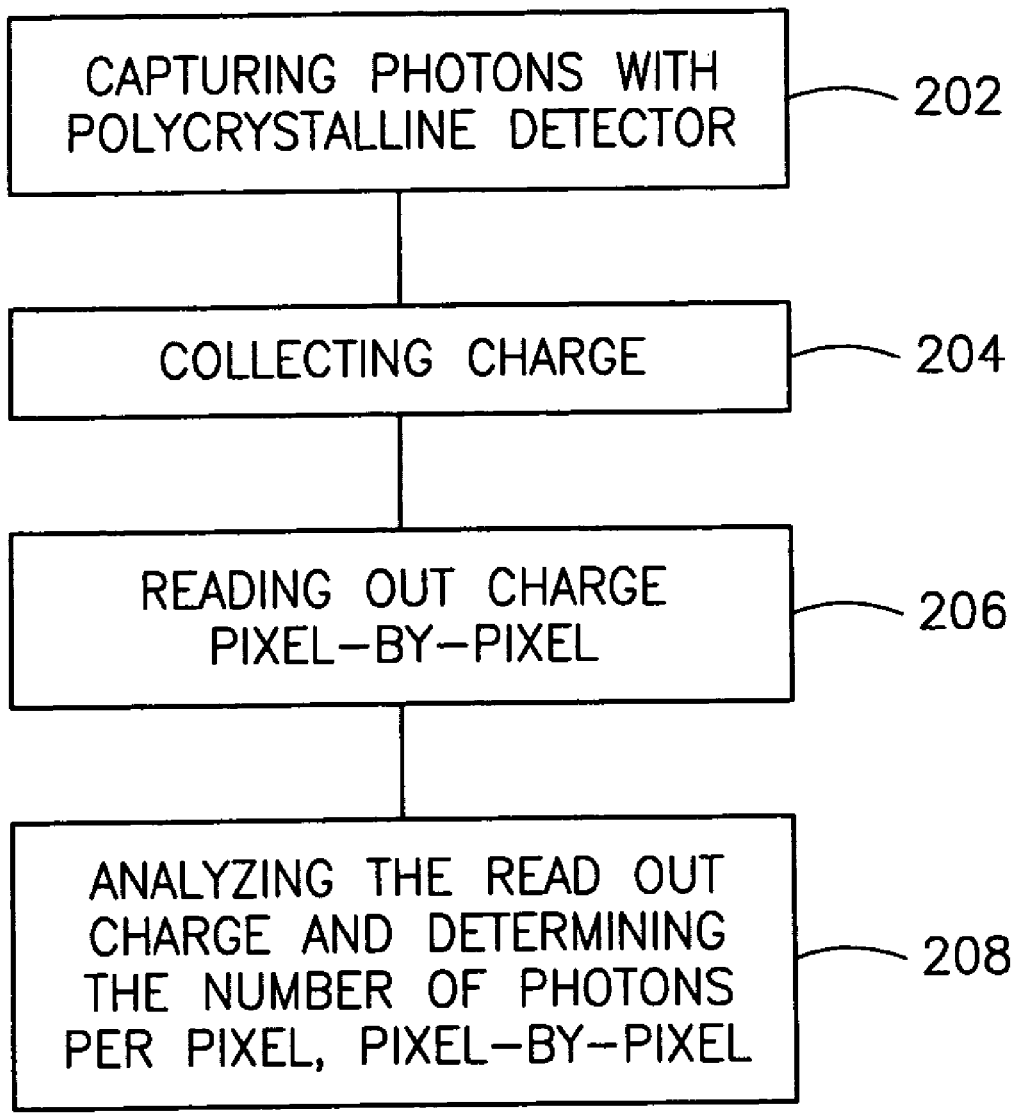
FIG. 7A contains a flow chart of the method of the present invention.
Figure 7B:
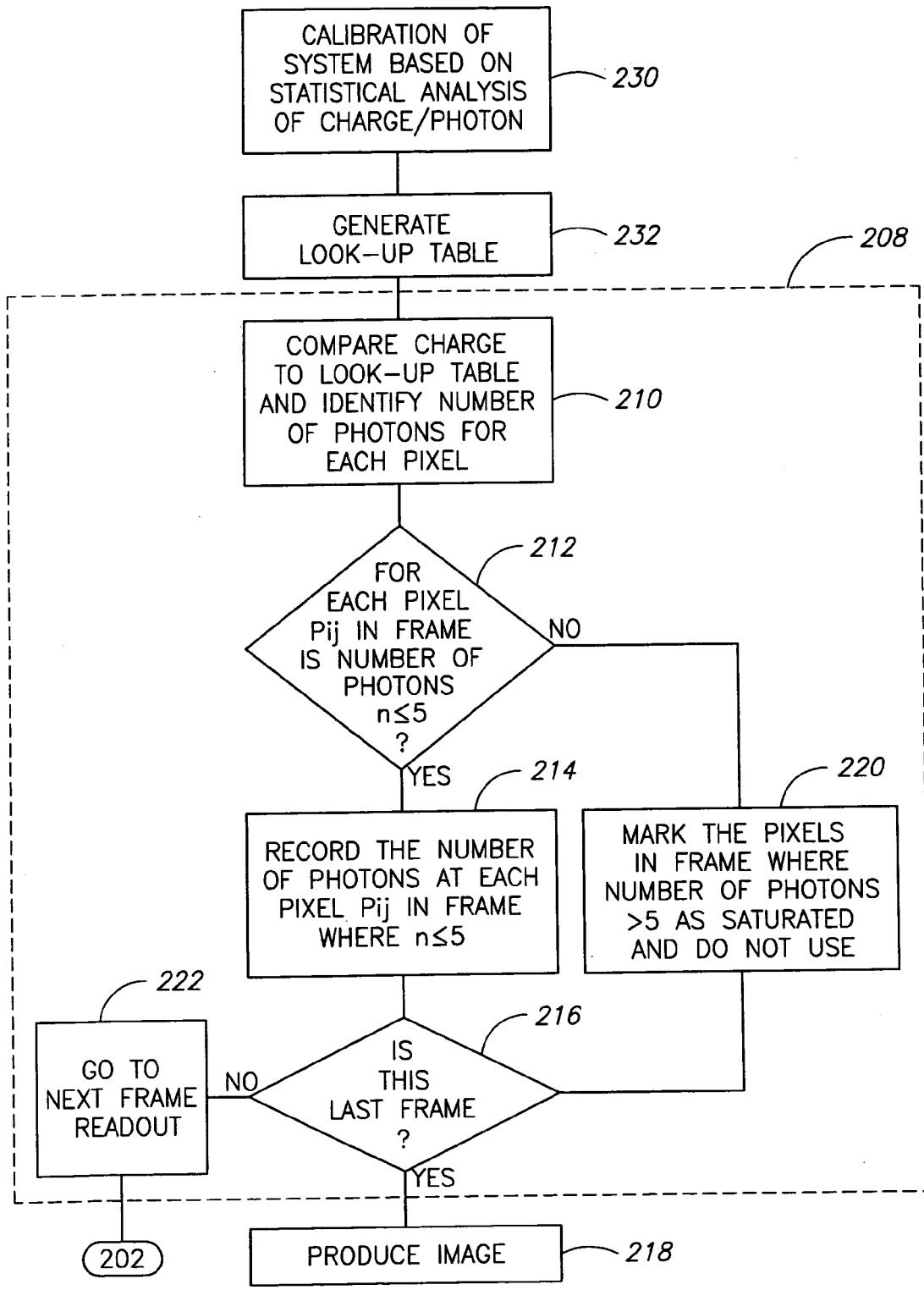
FIGS. 7B–7D illustrate three embodiments of the analyzing step of the method of the present invention shown in FIG. 7A.
Figure 7C:
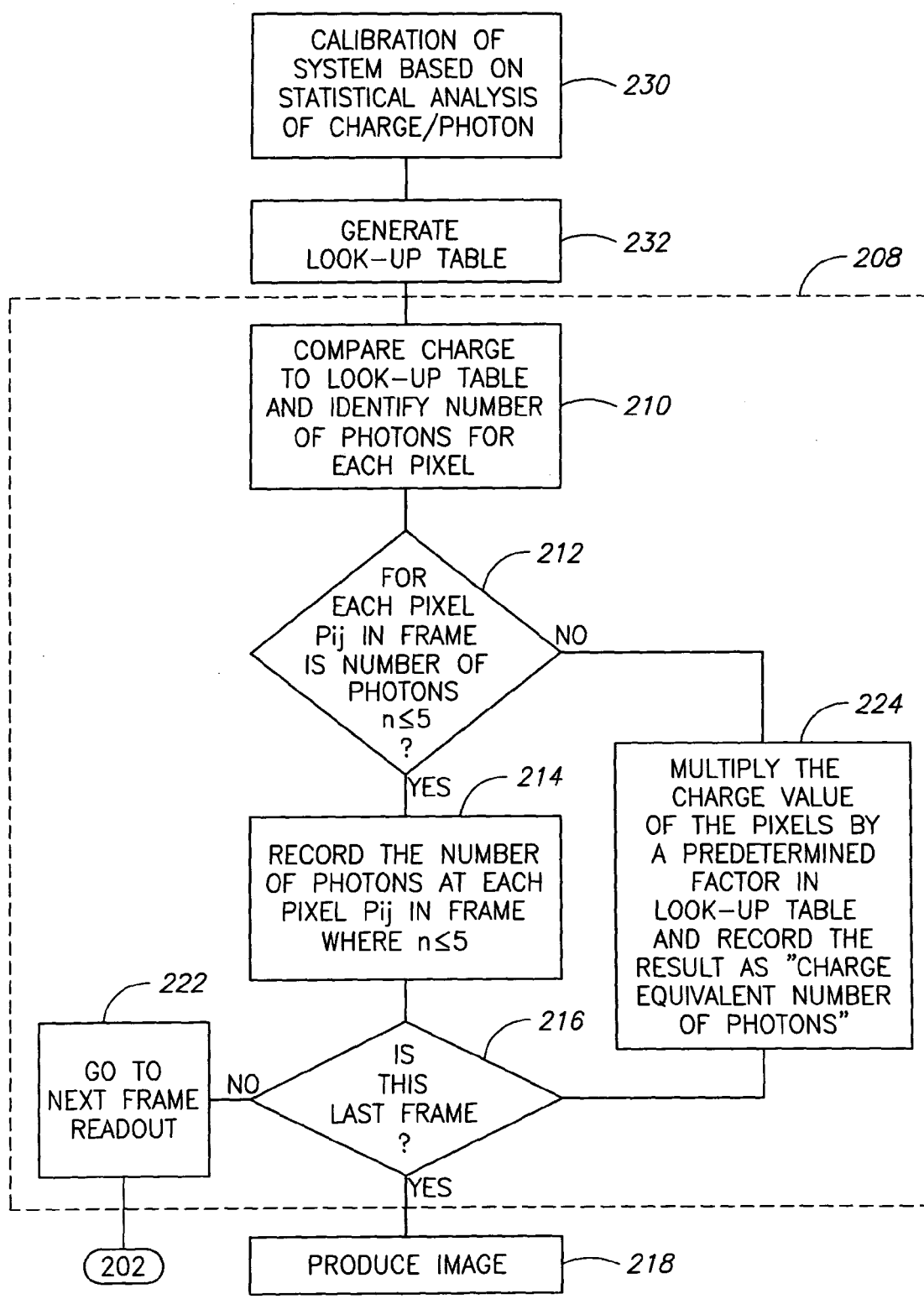
Figure 7D:
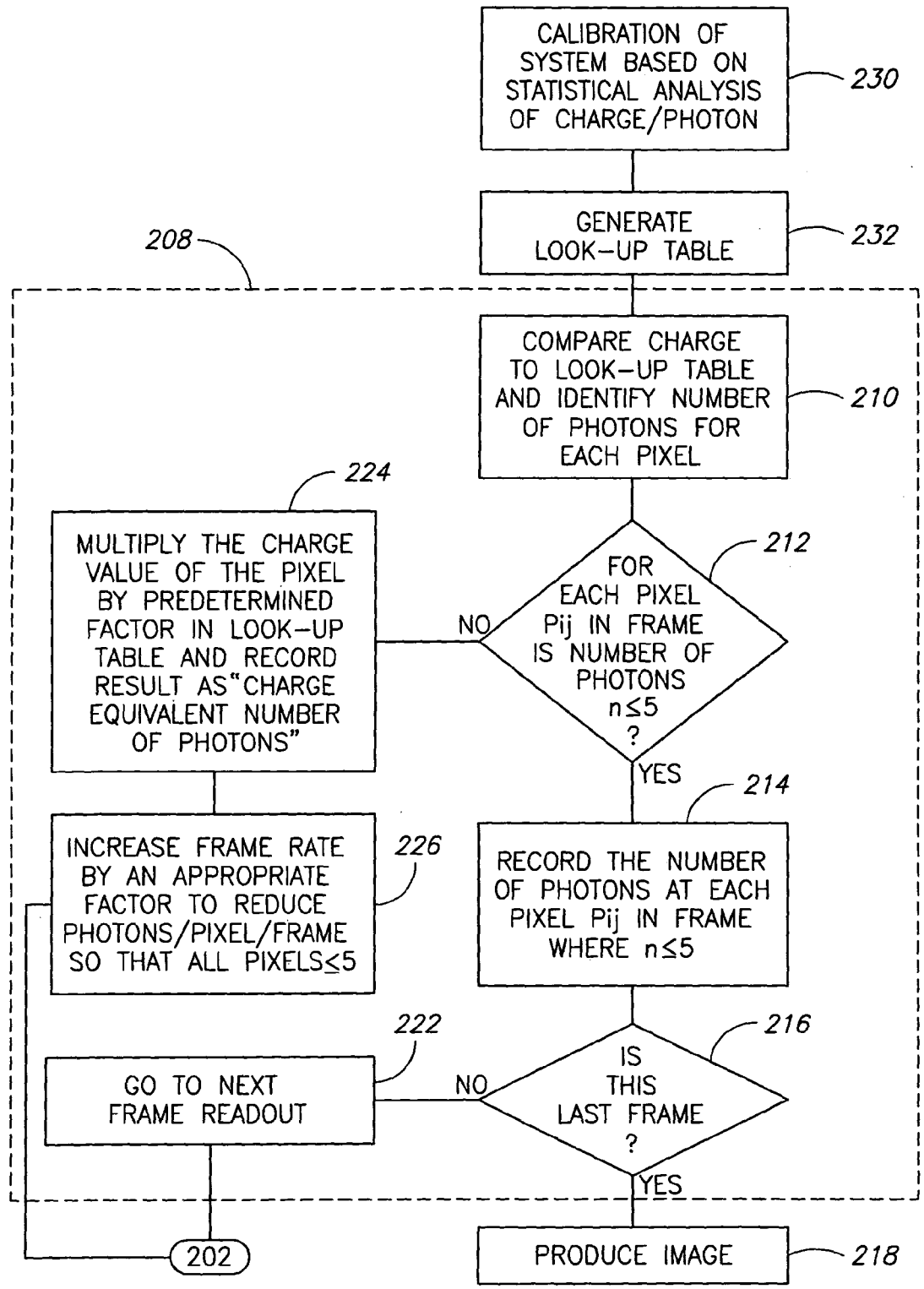
Figure 7E:
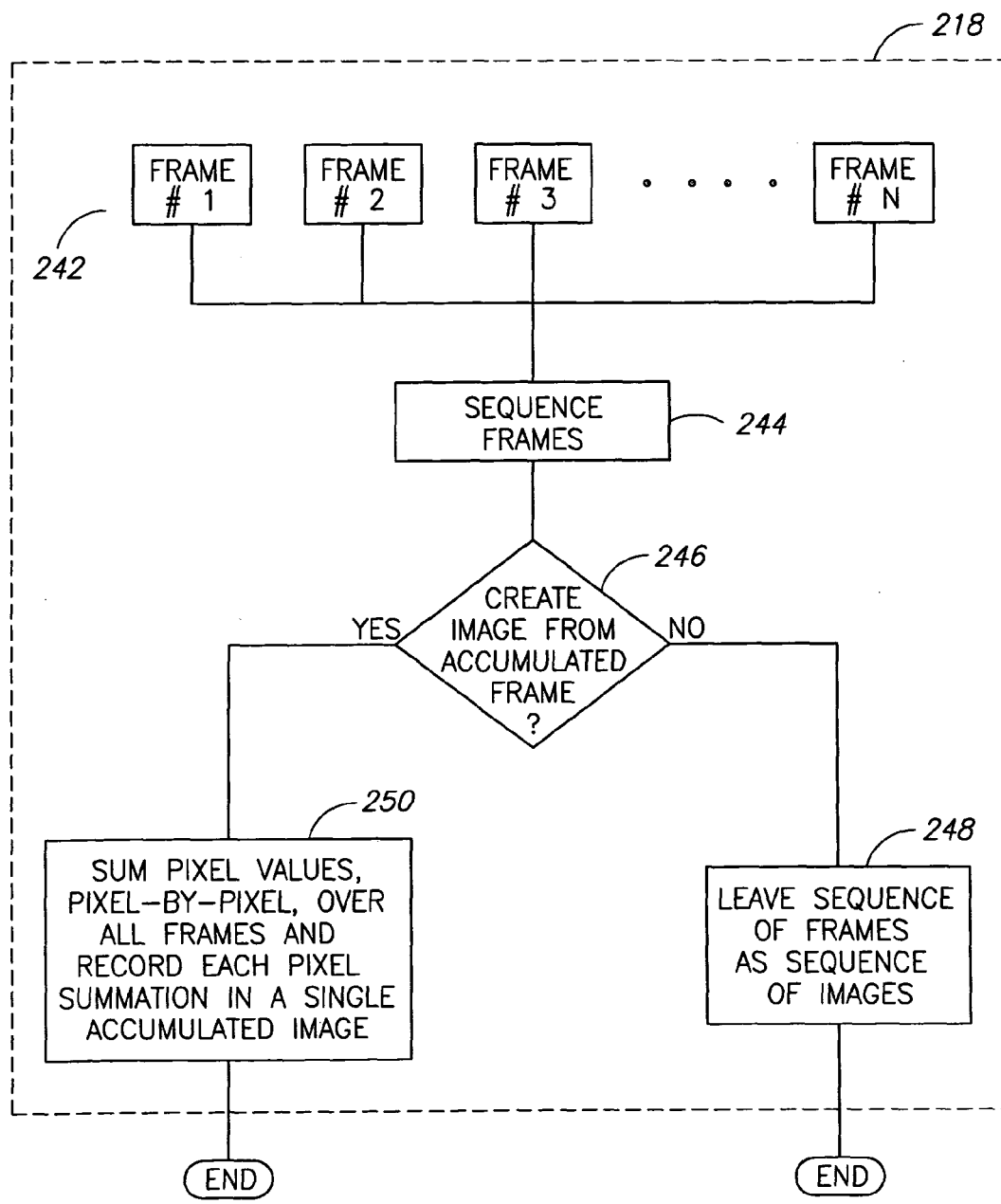
FIG. 7E contains a flow chart of alternative imaging procedures usable with the present invention as shown in FIGS. 7A–7D.

FIGS. 7A–7D, to which reference is now made, show flowcharts which illustrate several different embodiments using the method of the present invention. FIGS. 7B–7D represent only the counting and detecting stage of the method. FIG. 7E which is discussed below represents two possible imaging methods which can be applied to counts determined in the embodiments shown in FIGS. 7B–7D.

In FIG. 7A, photons of incident radiation are captured 202 by a polycrystalline photoconductive array detector. The radiation then generates charges within the detector which are collected 204 by a charge receptive substrate present in each pixel of the array. Low noise readout electronics read out 206, that is take off, the charge collected which is then analyzed 208 to detect and count the number of photons read out during the readout frame. The analysis is done on a pixel-by-pixel basis for each pixel of the array detector. In the read out step 206, the signals are typically read out over a period of time longer than about 10 ms, but these times are not to be viewed as limiting.

Figure 2:
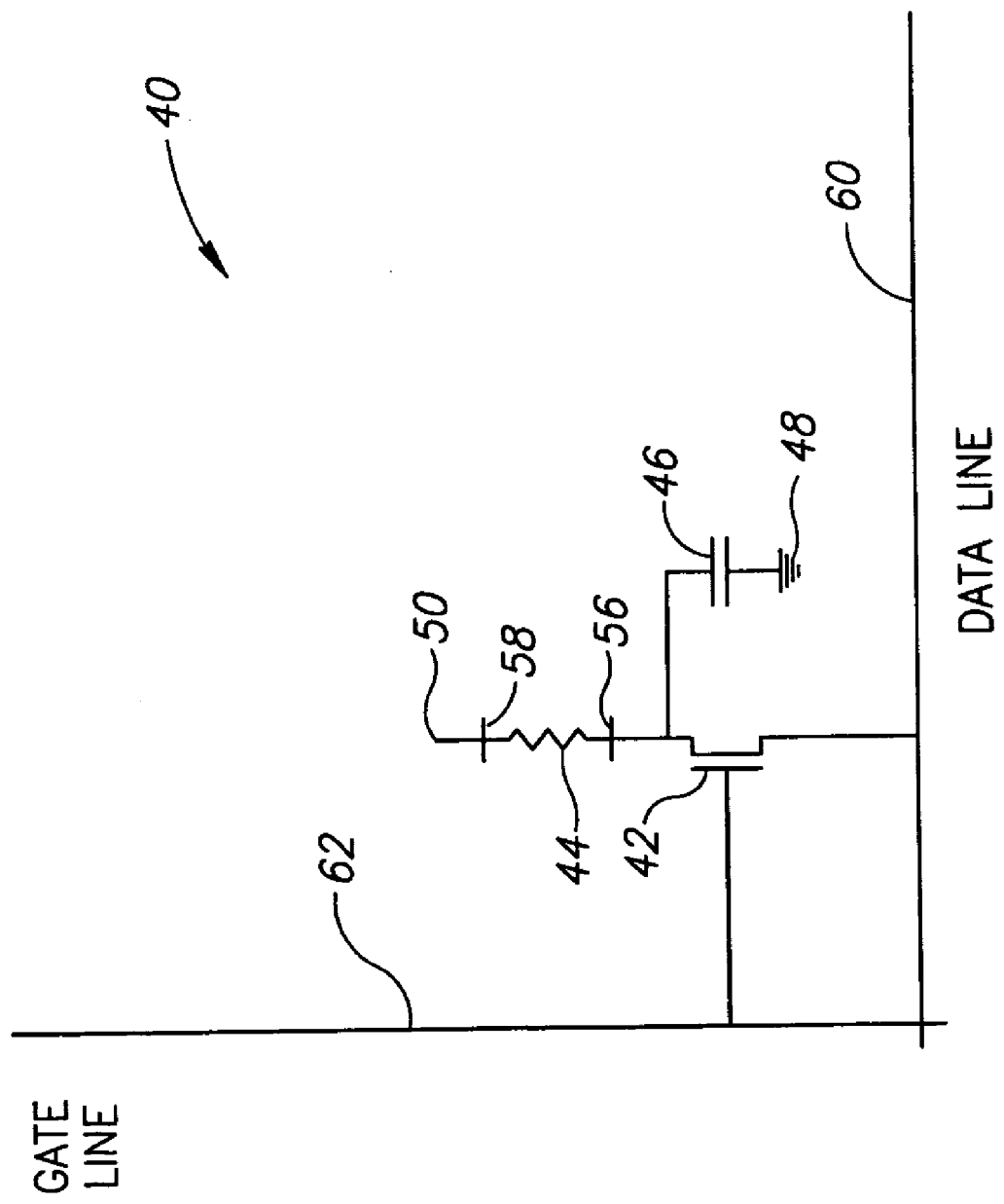
FIG. 2 is a schematic illustration of a pixel equivalent circuit for photoconductor imagers according to prior art.
Figure 3:
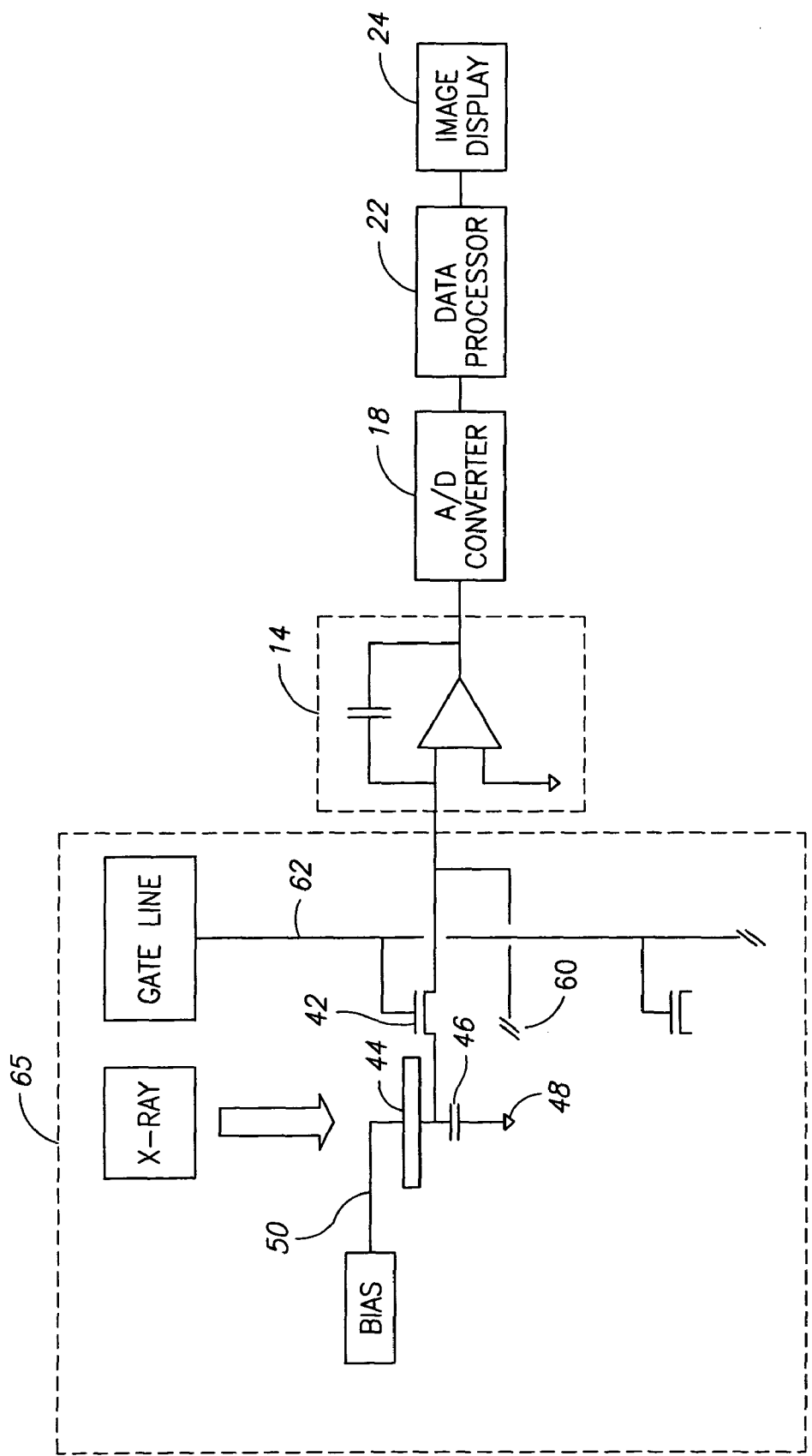
FIG. 3 is a mixed schematic and block diagram of the typical prior art detector shown in FIGS. 1 and 2.

It should be readily apparent to one skilled in the art that the system described in FIGS. 1–3 above can function as both a high and low flux radiation detector simultaneously i.e. in both charge collection and single photon modes, depending on the radiation flux present. The requirement for dual mode usage is that the electronics be low noise electronics and the S/N ratio of the system be high. This latter condition requires inter alia a photoconductor with mobility-lifetime product in excess of $10^{-5}$ cm$^2$/Vsec and a sensitivity of, on average, one electronic charge for each 15 eV or less of ionizing radiation energy detected. FIG. 7B–7D illustrates the possibility of such dual use. FIG. 7B represents a method that operates to detect and count only pixels positioned in a low flux environment while discarding pixels receiving a high flux number of photons. FIG. 7C detects and counts both high and low flux photons which are received by pixels. FIG. 7D detects and counts photons from both high and low flux and then alters the frame rate to effectively reduce the high flux to low flux.

FIG. 7B provides a detailed method for analyzing the readout in analyzing step 208 of FIG. 7A in accordance with one embodiment of the present invention. This embodiment functions in a flux environment which may be a low flux or a mixed high/low flux environment. However, only photons of pixels which are in a low flux environment, that is only pixels which have received five or fewer photons during the readout, are counted.

The use of the analyzing method in this embodiment is dependent on a calibration of the system. The system used to count and detect single photons is calibrated 230 based on a statistical analysis of the number of charges produced per photon over the expected distribution of photon energies. The calibration is carried out prior to application of the system. This calibration is effected in a manner very similar to the statistical analysis discussed above which was based on Eq. 1. Other methods of calibration are also possible.

After calibration 230, a relationship is generated between the amount of charge produced for a given number of photons. The relationship can be encapsulated numerically, for example in a look-up table, or analytically, for example, in a function or a formula, and stored in the detection system's processor 22 (FIG. 1). These relationships permit detection/counting of single photons. During the discussion of FIGS. 7B–7D below, a look-up table will be referred to, but it should be remembered that any numerical or analytical relationship relating amount of charge generated by a photon could also be used. The detection and counting embodiments of the present invention described in FIGS. 7C and 7D below, use a calibration procedure similar to the one described with FIG. 7B which generates a relationship which relates charge produced to photons received at a pixel.

FIG. 7B is one embodiment of analyzing step 208 shown in FIG. 7A. It can be thought of as an exploded detailed version of analysis step 208. Analysis step 208 shown in FIG. 7B begins by comparing 210 the charge read out from each pixel to values found in the look-up table stored in the system's processor 22 (FIG. 1). The number of photons that have produced the read out charge is determined by using the look-up table. This determination is done on a pixel-by-pixel basis.

A decision 212 is made as to whether pixel Pij has received n photons where n≦5 during the readout frame. If Pij has received five or fewer photons, the number of photons for the Pij frame is recorded 214 and stored. If it is determined in step 212 that n>5, the pixel is marked as saturated and not used.

Throughout the discussion herein, the maximum number n of discernible discrete photons will be taken to be 5. This appears to be a reasonably practical upper limit using current materials and electronics. However it should readily be understood that it could equally be any value from 1 through 5, or with better high S/N materials and electronics, even greater than 5. The determination of n is repeated for all Pij pixels of the r×s array detector, where i=1 through r and j=1 through s.

After the number of photons which have arrived at each pixel is recorded 214 and stored, a decision is made 216 as to whether the frame under consideration is the last frame. The last frame can be determined manually or by using a preset value. If the last frame has been reached, the system can use the stored pixel-by-pixel data to produce 218 an image. The image can be produced by the methods discussed below with FIG. 7E. If the last frame has not been reached, the system returns to the next (readout) which begins at capture photons step 202 of FIG. 7A.

FIG. 7C shows another embodiment for use as analyzing step 208 of FIG. 7A. It is used in a mixed high/low flux environment. Unlike the embodiment of FIG. 7B where only pixels which have been determined to receive five or fewer photons are used, in the embodiment of FIG. 7C all the pixels are counted and used. The flowchart shows that the embodiment of FIG. 7C is essentially the same as in FIG. 7B, with additional manipulation of those pixels which have been determined to have received more than five photons. After decision 212 indicates that a pixel has received n>5 pixels, the charge is multiplied by a factor which has been previously determined in calibration step 230 and stored with generated 232 look-up table in processor 22 of system 10 (FIG. 1). A pixel with n>5 is multiplied 224 by this factor which effectively averages photons per charge for more than five photons and produces a "charge equivalent number of photons" which then is recorded and stored. The remainder of the analysis is carried out in a fashion similar to the flowchart of FIG. 7B. The pre-established factor used in block 224 is essentially an "average value of photons per charge" because once the number of photons exceeds five, discrete charge steps as a result of incremental photons become progressively more difficult to distinguish. Again it should be remembered that five has been arbitrarily chosen. The sensitivity of the polycrystalline film and the noise of the system will determine the exact number of photons that can actually be distinguished.

FIG. 7D provides a more complex embodiment for analyzing step 208 of FIG. 7A. The embodiment operates much as in FIG. 7B where the pixels are classified on a pixel-by-pixel basis as having received five or fewer photons or more than five photons. Initially, the number of photons received by each pixel Pij is determined by comparing the charge read out from the pixel with a generated 232 look-up table based on pre-calibration 230. After the comparison is made 210 and the pixel Pij determined 212 to have received five or fewer photons, the number of photons of pixel Pij is recorded 214 and stored. A determination 216 is made whether the last frame has been tested, and if the last frame has been received an image is produced 218. If the last frame has not been reached, the system goes to the next frame readout 222 which begins at capture photon step 202 of FIG. 7A.

If pixel Pij has been determined to have received more than five photons the charge value of the pixel is multiplied 224 by a predetermined factor in the look-up table and recorded and stored as a "charge equivalent number of photons". This is essentially the same as discussed with the embodiment of FIG. 7C. The frame rate is then increased 226 by a predetermined factor to reduce the number of photons/pixel/frame so that for all pixels, n≦5. The system then returns to capture photon step 202 of FIG. 7A. These loops continue until the frame rate is increased to a rate such that nearly all pixels in a frame receive five or fewer photons. Once that frame rate is reached, the required number of frames are read out and the frames are used to produce 218 an image according to one of the methods shown in and discussed with FIG. 7E.

Note that in FIG. 7D, the embodiment reduces the photons/pixel/frame until nearly all pixels receive five or fewer photons. It should readily be understandable that in another embodiment, the increase in frame rate can continue until the number of photons received by substantially all the pixels is one or none. This embodiment would be particularly advantageous when resolving energies as discussed elsewhere herein.

It should be readily recognized by one skilled in the art that FIGS. 7B–7D represent only three of many possible embodiments that can be used for analyzing step 208 of FIG. 7A. The three embodiments are not to be considered as limiting.

Reference is now made to FIG. 7E, which shows a flowchart indicating two alternative image production treatments 218 of the N frames 242 collected using any of the embodiments shown in FIGS. 7A–7D. The N frames 242 are sequenced 244 and then a decision 246 is made as to whether the image will be created by accumulating the frames or not. If a determination is made to accumulate the frames, each of the pixel values for all N frames is accumulated 250 on a pixel-by-pixel basis and the summation of all the N values of each pixel is recorded in a single accumulated image. If the decision 246 is not to accumulate the image, the frames are left as a sequence of N frames producing a sequence of N images.

Figure 8:
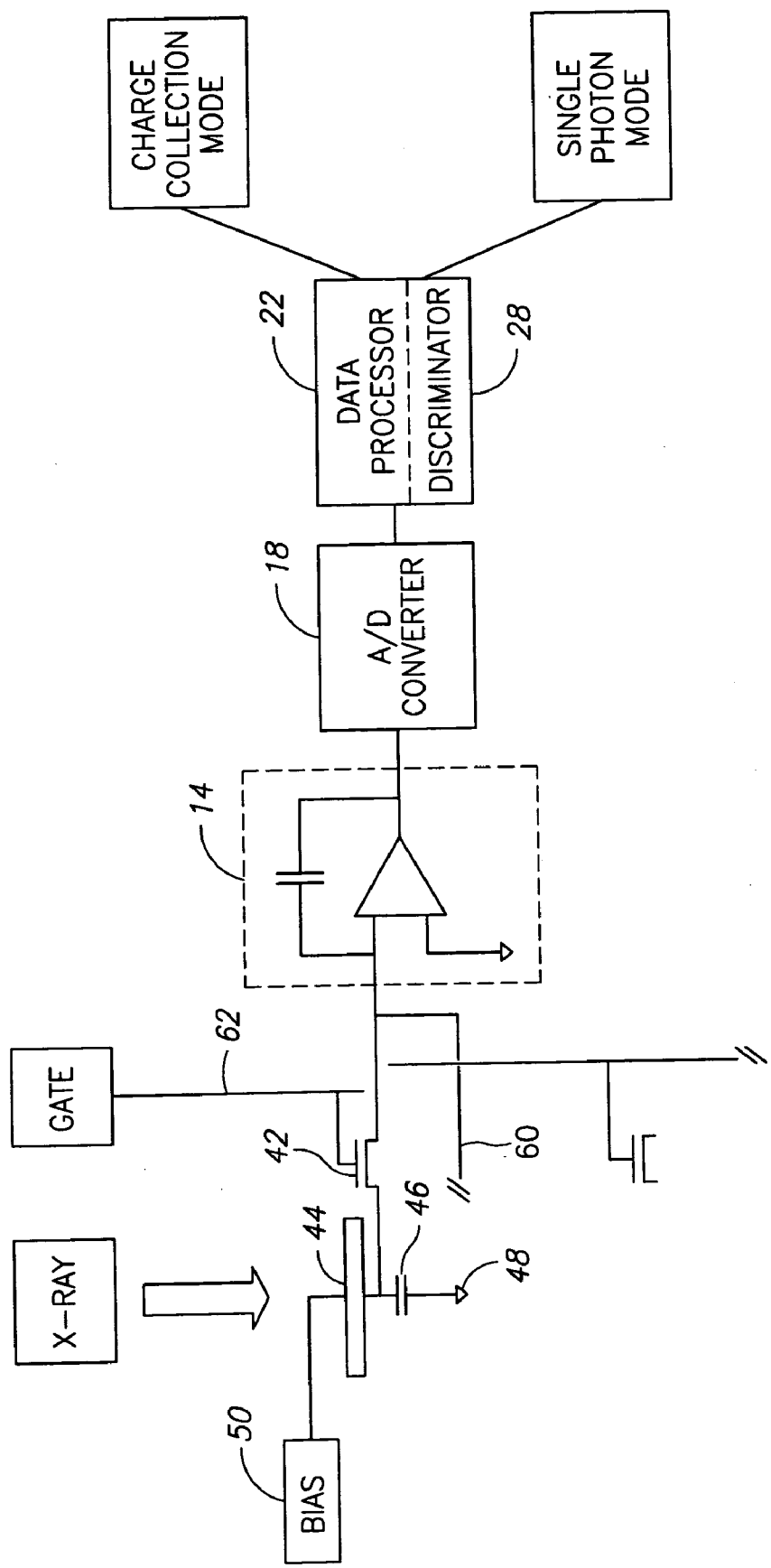
FIG. 8 shows a schematic diagram of a detection system constructed in accordance with a dual mode embodiment of the present invention.

Reference is now made to FIG. 8, where a schematic representation of a dual mode system is presented. The system may be used with the method described with FIG. 7C The Figure is very similar to FIG. 3 and will not be discussed again in detail. The single additional item in this system is a discriminator 28 which determines how the data arriving from a given pixel is to be detected, i.e. counted, and imaged. If the discriminator 28 determines that the pixel is in a high flux environment, the prior art charge collection mode is used. If the discriminator 28 determines that the pixel is in a low flux environment, imaging proceeds in single photon mode as discussed above. In FIG. 8 the image display is not shown.

FIG. 8 shows a discriminator 28 operative in real time on a pixel-by-pixel basis and part of processor 22. The discrimination is done algorithmically within the data processor, where the correct mode for imaging is determined. As an example of this algorithmic approach, when a pixel appears to be detecting single photons, that is when the system is in a low flux or low exposure environment and below a predetermined photon flux threshold, processor 22 of system 10 in FIG. 1 processes data in the single photon mode. When a pixel appears to operate in an environment above a predetermined threshold number of photons per pixel per readout, the system's processor processes the signals in the high flux or charge collection mode. The determination of whether a predetermined threshold number of photons has been reached is effected by using a look-up table as in FIG. 7C and the charge received is compared with the look-up table entries. It should readily be apparent to one skilled in the art that many algorithms, other than one based on a predetermined threshold value of photons, may be employed to determine when the signal of a pixel must be processed according to the charge collection or single photon mode. The use of a predetermined threshold value for (or charge) is not to be considered limiting.

Dual mode mixed image-generating systems should be useful in medical imaging. In such cases there may be simultaneous high and low flux regions, such as bone (low flux) and air (high flux), which are being imaged. In the low flux environment the image would be obtained fluoroscopically, that is by a more rapid readout of charge, leading to a series of single photon mode images. In the high flux environment, the image would be processed by the prior art charge collection method.

Dual mode systems can also be used in applications such as x-ray crystallography, where there are large signals in some regions on a very low background. Detection can be effected at highly exposed pixels using the charge collection mode, while the low background pixels can be imaged using the single photon counting method of the present invention. This should help achieve the maximum dynamic range.

In yet another dual embodiment, the system would read out the signal in charge collection mode for pixels having large exposures, while for pixels with small exposures, the number of photons can be counted in single photon mode as described in the present invention. This may reduce noise in low exposure regions.

In another embodiment of the present invention, electronics can be fabricated that provide energy discrimination, photon counting and storage at each individual pixel, so that the counted number is read out rather than the individual analog signals. Such electronics is readily achievable with CMOS electronics, and can in principle be made from large area electronics, preferably using polysilicon transistors.

Since $HgI_2$ as well as other photoconductors are deposited at low temperature, they are compatible with many substrates including glass, silicon wafers including those with CMOS circuitry, charged coupled devices (CCD), thin film transistors (TFT), flexible plastic substrates etc.

Any x-ray or radiation image detection that uses a low flux and requires a high sensitivity can benefit from single photon detection as described herein above. These applications include medical imaging by fluoroscopy, non-destructive testing, nuclear medicine, security screening, radiation monitoring, and x-ray diffraction.

It will be appreciated by persons skilled in the art that the present invention is not limited by what has been particularly shown and described herein above. Rather the scope of the invention is defined by the claims that follow.

What is claimed is:

1. A method for detecting single photons of high-energy radiation using a detector comprising an array of pixels, each pixel including a charge receptive substrate, said method including the operations of:
   capturing high energy photons with the pixel array, the photons generating high-energy ionizing particles within a polycrystalline film deposited on the pixels, and whereby the ionizing particles generate a charge;
   collecting the generated charges in each pixel by the charge receptive substrate thereof;
   reading out the collected charges using low noise electronics;
   analyzing the read out charges, thereby to detect single photons;
   switching to charge collection mode when a pixel is located in a high radiation flux environment:
   processing the collected charges according to charge collection mode;
   returning to the single photon mode when the pixel is located in a low radiation flux environment, thereby to detect single photon events in that pixel; and
   repeating said switching through returning operations as often as dictated by the magnitude of the radiation flux.

2. A method according to claim 1, wherein the pixels in the array are each less than 1×1mm.

3. A method according to claim 1, wherein the polycrystalline film has a mobility-lifetime product exceeding $10^{-5} cm^2/Vsec$.

4. A method according to claim 1, wherein the detector detects on average at least one electronic charge for each 15 eV or less of incident high energy radiation detected.

5. A method according to claim 1, wherein said analyzing operation includes the operation of comparing the read out collected charges from the reading out operation to a previously determined relationship, the relationship being generated from a calibration based on a statistical analysis of charges/photon over an expected range of photon energies, the relationship being stored in a processor prior to beginning said capturing operation.

6. A method according to claim 5, wherein the relationship is stored as a look-up table.

7. A method according to claim 5, wherein the relationship is stored as a function.

8. A method according to claim 1, further including the operation of imaging the pixels in which single photons have been detected.

9. A method according to claim 1 wherein said analyzing operation further includes the operations of:
   comparing the read out collected charges from said reading out operation to a previously determined relationship, the relationship generated from a calibration based on a statistical analysis of charge/photon over an expected range of photon energies, the relationship being stored in a processor prior to beginning said capturing operation;
   identifying the pixels interacting with fewer than a predetermined number of photons during a readout based on the comparison of said comparing operation;
   recording the number of photons at each identified pixel in a frame; and
   after said analyzing operation:
   preparing an image based on the pixels identified in said identifying operation.

10. A method according to claim 9, wherein the relationship is stored in a format chosen from the group of: a look-up table, a function and a formula.

11. A method according to claim 1, wherein said analyzing operation includes detecting single photon events in a series of frames taken over a period of time.

12. A method according to claim 11, wherein the series of frames is taken at a rate of from about 1 to about 100 frames per second.

13. A method according to claim 11, wherein the series of frames is taken at a rate of from about 15 to about 30 frames per second.

14. A method according to claim 11, wherein the series of frames is imaged as a series of images.

15. A method according to claim 11, wherein the series of frames is accumulated pixel-by-pixel into a single image, each pixel Pij of the image being equal to the sum of the corresponding Pij pixels in the series of frames.

16. A method according to claim 1 wherein said analyzing operation further includes a discriminating operation that discriminates between photon energies differing by at least 5 keV, said discriminating operation being effected using a readout rate which detects no more than one photon per frame.

17. A method according to claim 1, further including the operation of imaging the detected photons.

18. A method according to claim 1, wherein said switching and returning operations are effected by a processor having discriminator software that discriminates in real time whether a pixel is in a low or a high flux environment.

19. A method according to claim 1, wherein the charge receptive substrate is chosen from a group consisting of a thin film transistor (TFT), a complementary metal oxide semiconductor (CMOS), and a charge coupled device (CCD).

20. A method according to claim 1, wherein the polycrystalline film has a thickness sufficient to absorb 50% of the incident high energy radiation.

21. A method according to claim 1, wherein the polycrystalline film is chosen from a group of materials consisting of mercuric iodide, bismuth iodide, lead iodide, thallium bromide, selenium, lead oxide, mercuric telluride, cadmium-zinc-telluride, and cadmium telluride.

22. A method according to claim 1, wherein the high energy radiation is high flux radiation and wherein said reading out operation reads out the collected charges rapidly so that it generates an effective low flux where single photon events are detectable during said analyzing operation.

23. A method for detecting single photons of high-energy radiation according to claim 1, detection being effected by:
   detector comprising an array of pixels, each pixel having:
      a polycrystalline photoconductive film having a mobility-lifetime product exceeding $10^{-5} cm^2/Vsec$;
      a conductive contact pad to contact said polycrystalline film;
      a conductive contact deposited on top of said film, said contact to provide a bias voltage;
      a charge receptive substrate which collects charges generated in said films by the high-energy photons, said substrate having said film deposited thereon;
      low-noise electronics in communication with said substrate and reading out the charges collected by said substrate; and
      a processor for processing a digital signal produced in and transferred from said electronics, said processor using a previously determined relationship between charges produced per photon to detect single photons, said relationship stored in said processor.

24. A method according to claim 23, wherein the polycrystalline film is chosen from a group of materials consisting of mercuric iodide, bismuth iodide, lead iodide, lead oxide, thallium bromide, selenium, mercuric telluride, cadmium-zinc-telluride, and cadmium telluride.

25. A system for detecting single photons of high energy radiation, said system including:
   a detector, said detector including a pixel array, each pixel of said array having a polycrystalline photoconductive film deposited on a charge receptive substrate, said detector operative to capture high-energy photons;
   low noise electronics for reading out charges generated by the high energy photons when the photons interact with said film, the generated charges of each of said pixels being collected by said charge receptive substrate of said pixel and read out by said electronics; and
   a data processor in communication with said low noise electronics, said processor including a stored previously determined relationship between charge produced per incident photon, said relationship used for comparing the collected charges with said relationship, thereby to detect single photons;
   wherein said processor is preprogrammed to determine the magnitude of a flux of the radiation, and to switch processing from charge collection mode to single photon mode and vice-versa when said system or parts thereof are positioned in fluxes of varying magnitudes.

26. A system according to claim 25, wherein said stored relationship is a look-up table generated from a prior calibration of charge produced per incident photon.

27. A system according to claim 25, wherein said stored relationship is a function generated from a prior calibration of charge produced per incident photon.

28. A system according to claim 25, wherein said polycrystalline film has a mobility-lifetime product exceeding $10^{-5} cm^2/Vsec$.

29. A system according to claim 25 wherein the switching is effected by processor software which determines when the flux impinging a pixel is below a predetermined threshold value.

30. A system according to claim 25, wherein said charge receptive substrate includes an electronic circuit fabricated from thin film electronic devices deposited on an inert substance.

31. A system according to claim 25, wherein said polycrystalline film is chosen from a group of materials consisting of mercuric iodide, bismuth iodide, lead iodide, thallium bromide, selenium, lead oxide, mercuric telluride, cadmium-zinc-telluride, and cadmium telluride.

32. A system according to claim 25, wherein said charge receptive substrate is chosen from a group consisting of a thin film transistor (TFT), a complementary metal oxide semiconductor (CMOS), and a charge coupled device (CCD).

* * * * *